United States Patent [19]

White et al.

[11] Patent Number: 4,587,136

[45] Date of Patent: May 6, 1986

[54] CURABLE ORGANOPOLYSILOXANE COMPOSITIONS

[75] Inventors: James W. White, S. Glamorgan; Brian J. Griffiths, Mid Glamorgan, both of United Kingdom

[73] Assignee: Dow Corning Ltd., Barry, Wales

[21] Appl. No.: 713,940

[22] Filed: Mar. 20, 1985

[30] Foreign Application Priority Data

Apr. 4, 1984 [GB] United Kingdom ............... 8408621

[51] Int. Cl.$^4$ .............................................. B05D 3/06
[52] U.S. Cl. ............................ 427/54.1; 204/159.13; 428/419; 428/447; 428/423.5; 428/423.7; 4 428/450; 428/451; 428/454; 528/12; 528/20; 528/21; 528/30; 428/424.8
[58] Field of Search .................. 204/159.13; 427/54.1; 428/447, 419, 423.5, 423.7, 424.8, 450, 451, 454; 528/30, 12, 20, 21

[56] References Cited

U.S. PATENT DOCUMENTS 4,268,655  5/1981  Homan et al. .................. 204/159.13
4,391,963  7/1983  Shirahata ....................... 204/159.13

FOREIGN PATENT DOCUMENTS 1553586  10/1979  United Kingdom .
1569681  6/1980  United Kingdom .

*Primary Examiner*—Melvyn I. Marquis
*Attorney, Agent, or Firm*—George A. Grindahl

[57] ABSTRACT

Compositions curable by radiation e.g. UV radiation are disclosed and claimed which comprise an organosiloxane having at least two siloxane units including groups —RSH, an organosiloxane having at least two siloxane units including ethylcyclohexenyl groups, and a photoinitiator. The compositions cure on exposure to UV radiation and may be used to produce on a variety of substrates coatings which are of reduced odor. Also, disclosed and claimed is a method of treating a substrate which comprises applying a coating of such compositions and irradiating the coating. Examples given refer to production of coatings on paper substrates to provide cured coatings.

14 Claims, No Drawings

CURABLE ORGANOPOLYSILOXANE COMPOSITIONS

This invention relates to compositions which are curable by exposure to ultra-violet radiation and to the use of such compositions for coating substrates.

BACKGROUND OF THE INVENTION

The application of siloxane compositions to provide coatings on various substrates for example to improve the release of adhesive and other materials therefrom has been practised for many years. Although the conventional siloxane release coating compositions normally perform satisfactorily in use there is a continuing demand for improved compositions. In particular a need has been expressed for compositions which cure faster and which require the application of less energy for the curing step. Also if such compositions could be applied in the absence of a solvent or other diluent this would represent an additional advantage.

British Pat. No. 1 553 586 discloses radiation-curable polydiorganosiloxane compositions consisting essentially of a mixture of (A) a triorganosiloxy-endblocked polydiorganosiloxane fluid wherein from 1 to 5 percent of all radicals are mercaptoalkyl having the formula —(CH$_2$)$_n$SH wherein n has a value of from 1 to 4 inclusive; and (B) a methylvinylpolysiloxane compatible with (A) and having an average of at least 3 silicon-bonded vinyl groups per molecule. The compositions may also contain a photosensitising compound. Compositions of this type can be applied in the solventless condition to a substrate and cured rapidly to provide non-adhesive coatings. However, it has been found that the coatings often exhibit a slight but disagreeable odour after curing especially if the coated substrate, e.g. paper, is stored in the rolled up state.

In British Pat. No. 1 569 681 there are described compositions which are curable by ultra-violet radiation and which comprise (a) an organopolysiloxane having in the molecule at least one mercaptoalkyl-containing organosiloxane unit, (b) an organopolysiloxane having in the molecule at least one allyl-containing organosiloxane unit and (c) a photosensitiser. The patent also discloses the use of the said compositions for providing release coatings on paper. Although the odour associated with the compositions of Pat. No. 1 569 681 is not as marked as that referred to hereinabove the allyl-siloxane component is difficult and relatively expensive to prepare.

SUMMARY OF THE INVENTION

The invention provides in one of its aspects a curable organosiloxane composition comprising (A) an organosiloxane having in the molecule at least two siloxane units of the general formula $$HSRSiO_{\frac{3-a}{2}}^{R'_a} \quad \text{(i)}$$

wherein R represents a divalent saturated aliphatic hydrocarbon group having from 3 to 8 inclusive carbon atoms, R' represents a monovalent hydrocarbon group having from 1 to 6 inclusive carbon atoms and free of aliphatic unsaturation, an alkoxy group having from 1 to 4 carbon atoms or an alkoxyalkoxy group having from 2 to 6 carbon atoms and a has a value of 0, 1 or 2, any remaining units having the general formula $$R''_b SiO_{\frac{4-b}{2}} \quad \text{(ii)}$$

wherein R" represents a monovalent hydrocarbon group having from 1 to 6 carbon atoms and free of aliphatic unsaturation and b has a value of 0, 1, 2 or 3 at least 50 percent of the total R' and R" groups being methyl, (B) an organosiloxane having in the molecule at least two units of the general formula

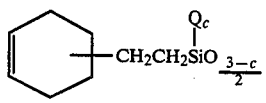

wherein Q represents a monovalent hydrocarbon group having from 1 to 6 inclusive carbon atoms and free of aliphatic unsaturation, an alkoxy group having from 1 to 4 carbon atoms or an alkoxyalkoxy group having from 2 to 6 carbon atoms and c is 0, 1 or 2, any remaining units having the general formula $$Q'_d SiO_{\frac{4-d}{2}} \quad \text{(iv)}$$

wherein Q' is as defined for R" and d has a value of 0, 1, 2 or 3, at least 50 percent of the total Q and Q' groups being methyl, and (C) a photoinitiator.

The invention provides in another of its aspects a process for treating a substrate which comprises applying to the substrate a coating of a curable organosiloxane composition according to the invention and thereafter exposing the coating to ultra violet radiation.

The organosiloxanes employed as component (A) of a composition according to this invention have in the molecule at least two mercaptoalkyl siloxane units falling within the general formula (i). In the general formula R may be any divalent saturated aliphatic group having from 3 to 8 carbon atoms, for example —(CH$_2$)$_3$—, CH$_2$CH(CH$_3$)CH$_2$, —(CH$_2$)$_4$— and —(CH$_2$)$_6$—. The substituent R', when present, may be for example methyl, ethyl, propyl, phenyl, methoxy, ethoxy or methoxyethoxy. The organosiloxanes (A) may be homopolymers consisting only of units (i), for example as in the cyclic siloxanes, or they may be copolymers containing both units (i) and units falling within the general formula (ii). In the copolymeric units (ii), R" may be any monovalent hydrocarbon group having from 1 to 6 carbon atoms and free of aliphatic unsaturation, for example methyl, ethyl, propyl or phenyl. At least 50 percent, and preferably substantially all, of the total R' and R" substituents should be methyl. It is therefore preferred that each R' and each R" is methyl.

The mercaptoalkyl substituents in organosiloxanes (A) may be attached to any of the silicon atoms in the molecule, that is they may be present in chain terminating units HSR(R')$_2$SiO$_{0.5}$, in HSR(R')SiO or in HSRSiO$_{1.5}$ units. The organosiloxanes (A) may vary in molecular size from the disiloxanes to high molecular weight polymers and may range in consistency from freely-flowing liquids to resinous solids. When the compositions of this invention are intended for the provision of release coatings on paper and other flexible substrates the preferred organosiloxanes (A) are polydiorganosiloxanes having from about 50 to about 500 siloxane units and a viscosity of from about 50 to about 10,000 cS at 25° C., (i.e. $5 \times 10^{-5}$ m²/s to $10^{-2}$ m²/s) at least three of the said siloxane units, and preferably from 5 to 20 percent of the total siloxane units of organopolysiloxane (A) more preferably from 5 to 10 percent thereof having therein a HSR— group attached to silicon.

Organosiloxanes (A) are in general known substances and methods for preparing such organosiloxanes will be evident to those skilled in the art. For example, according to one method a silane bearing silicon-bonded hydrolysable atoms or groups and a mercaptoalkyl group HSR— is hydrolysed and condensed to prepare a mixture of cyclic and linear siloxanes which is then mixed with cyclic and/or linear siloxanes having units

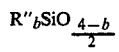

and the mixture equilibrated employing a suitable catalyst. The mixture preferably contains a source of endblocking units e.g. hexamethyldisiloxane but such source may be omitted e.g. where a high molecular weight organopolysiloxane is required. Another, less preferred method comprises reacting a hydroxyl-terminated polydiorganosiloxane with a silane HSRSiR$_a$(OAlk)$_{3-a}$ wherein OAlk is an alkoxy group and a is 0 or 1.

The organosiloxanes employed as component (B) of a composition according to this invention are organosiloxanes having in the molecule at least two cyclohexenylethyl substituted siloxane units of the general formula (iii)

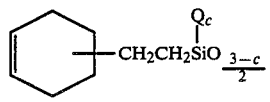

wherein Q is a monovalent hydrocarbon group having from 1 to 6 inclusive carbon atoms and being free of aliphatic unsaturation, an alkoxy group having from 1 to 4 carbon atoms or an alkoxyalkoxy group having from 2 to 6 carbon atoms. Examples of the Q substituents are therefore methyl, ethyl, propyl, phenyl, methoxy, ethoxy and methoxyethoxy. The organosiloxanes (B) may be homopolymers (e.g. cyclic siloxanes) consisting only of units (iii) or they may be copolymers consisting of units (iii) and units (iv). In the copolymeric units (iv) Q' is as defined for R" and each Q' may therefore be for example methyl, ethyl, propyl or phenyl. At least 50 percent, and preferably substantially all, of the total Q and Q' groups are methyl groups.

The cyclohexenylethyl groups may be attached to any of the silicon atoms in the organosiloxane molecule. For example, when the organosiloxane is a linear molecule the cyclohexenylethyl groups may be attached to terminal silicon atoms or non-terminal silicon atoms. As in the case of organosiloxanes (A) the organosiloxanes (B) may vary in molecular size from freely-flowing liquids to gumlike or resinous solids. The preferred organosiloxanes (B) for use in coating compositions for flexible substrates are polydiorganosiloxanes having a viscosity of from about 20 to about 5000 cS at 25° C. (i.e. about $2 \times 10^{-5}$ m²/s to about $5 \times 10^{-3}$ m²/s).

Examples of organosiloxanes (B) which may be used in the invention include

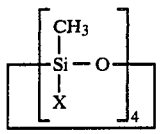

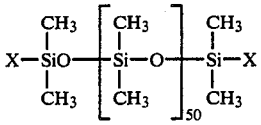

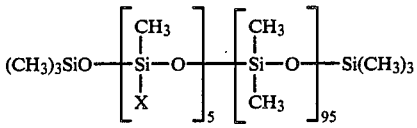

and

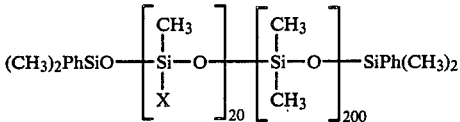

wherein X represents the cyclohexenylethyl group

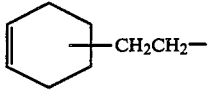

and pH represents the phenyl group. In those compositions intended for application to provide coatings adherent to paper and having release performance in relation to pressure sensitive adhesives we prefer to employ substantially linear organosiloxane copolymers according to the general formula

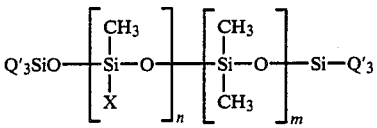

where m and n are values greater than 0 and where Q' and X are as referred to above, and Q' is preferably methyl.

Preferably the values m and n are such that the ratio m is as large as practicable bearing in mind the requirements for application viscosity, cure profile and properties of the cured compositions e.g. release characteristics of the cured coating. Preferred copolymers are such that n has a value from about 5 to about 20; the value m may conveniently be selected in accordance with desired characteristics of the composition and cured film and may be for example from about 140 to about 500.

The organosiloxanes (B) may be prepared by the addition of vinylcyclohexene to an organosiloxane having silicon-bonded hydrogen atoms, for example a trimethylsiloxy end-stopped copolymer of methylhydrogensiloxane and dimethylsiloxane. The addition reaction is best carried out in the presence of a platinum catalyst e.g. chloroplatinic acid or a supported platinum catalyst. According to another method of preparing organosiloxanes (B) vinylcyclohexene can be reacted with a polymethylhydrogen siloxane and the resulting polymer equilibrated with a source of dimethylsiloxane units such as a cyclic dimethylsiloxane. In another method vinyl-cyclohexene can be reacted with a trialkoxysilane and the resulting cyclohexenylethyl trialkoxysilane then reacted with a hydroxyl-terminated polydiorganosiloxane.

Photoinitiator substances which are effective in reducing the reaction time between components (A) and (B) in the presence of U.V. radiation may be employed as component (C) of this invention. Various photoinitiator substances are known in the art and examples include aromatic ketones e.g. acetophenone, benzophenone and 4,4'-diaminobenzophenone, benzoin compounds e.g. benzoin, benzoin methyl ether and benzoin ethyl ether, quinone and anthrone compounds e.g. hydroquinone, anthraquinone, napthoquinone and 3-methyl-1,3-diazo-1,9-benzanthrone, phenolic compounds e.g. 2,4-dinitrophenol and azo compounds e.g. azo-bis-isobutyronitrile. The preferred photoinitiators are those which are freely miscible with the other components of the composition. The use of compatible photoinitiators avoids the difficulties which may arise due to separation of this component on storage.

The compositions of this invention may be prepared by simply mixing components (A), (B) and (C) in any order. In the undiluted state components (A) and (B) react together in the presence of (C) and ultra-violet radiation. They may, however, be stored in the mixed state in the absence of such radiation, for example in lightproof containers or storage areas. For maximum storage stability it is preferred to provide the compositions as a two package system, the organosiloxanes (A) and (B) being packaged separately and the photoinitiator being present in one or both packages.

For the production of crosslinked products the sum of the HSR'— groups in (A) and the cyclohexenylethyl groups in (B) should be at least 5. It is normally preferred that the organosiloxane components of the compositions be employed in proportions such that there is an excess of mercaptoalkyl groups with respect to the cyclohexenylethyl groups. In preferred compositions for paper coating we prefer to employ the organosiloxanes in quantities to provide a ratio of SH groups to unsaturated groups of the order of 2:1. However, depending on the relative molar contents of the organosiloxanes and their molecular weights the relative weight proportions of the organosiloxane components may vary within wide limits.

The photoinitiator component may be employed in conventional amounts, from about 0.1 to about 5 percent by weight, based on the total weight of (A) and (B) usually being sufficient.

The compositions of this invention are comparatively easy to produce and may be used for treatment of a variety of substrates and cured thereon by exposure to actinic radiation, particularly in the form of ultra-violet radiation to produce adherent coatings having generally acceptable odour. Although curing will take place slowly in the presence of normal daylight it is preferred to accelerate the cure rate by exposure to lamps which emit U.V. light, preferably with a wavelength in the range from 250 to 450 nm for example medium pressure mercury lamps. The compositions may be applied to substrates such as metals e.g. aluminium, iron, steel and copper, plastics e.g. nylon, polyester, polyethylene and polypropylene, siliceous materials e.g. ceramics and cement, and textiles e.g. cotton and synthetics. Preferred compositions are particularly useful for the formation of release coatings on cellulosic materials such as paper, plastics coated paper and paper board. The compositions may be applied to the substrate employing any suitable means such as dip coating, spraying, doctor blade or gravure roll.

In addition to components (A), (B) and (C) compositions according to this invention may contain ingredients normally present in curable coating compositions. For example, the compositions may be diluted with organic solvents to facilitate application to some substrates. However, when a significant amount of solvent is present it may be necessary to subject the coated substrate to elevated temperatures prior to curing in order to effect solvent removal therefrom. Other ingredients which may be present include fillers, pigments and additives for modifying the release properties of the coating.

DETAILED DESCRIPTION

In order that the invention may become more clear there now follows a description of examples of compositions and their use for treatment of substrates, each of which example compositions and methods of use is provided by the invention and illustrative thereof.

In the examples the parts are expressed by weight and Me represents the methyl group.

EXAMPLE 1

4-vinylcyclohexene (216 g) was reacted with a cyclic siloxane $(MeHSiO)_4$ (90 g) in the presence of chloroplatinic acid ($10^{-4}$ mole per mole SiH) as catalyst. The product was the corresponding cyclic methyl (cyclohexenylethyl) siloxane and contained no detectable residual SiH groups.

This siloxane product (6.0 parts) was then mixed with 92.5 parts of a siloxane

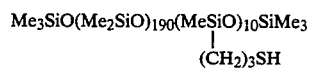

and benzophenone (1.5 parts) and the resulting mixture coated on to Super Callendered Kraft paper using a blade coater at a level of about 0.8 g per square meter. The coated paper was then exposed to light from a medium pressure mercury vapour lamp rated at 80 w/cm held at a distance of 50 mm and focused by an elliptical reflector. The exposed coating cured in approximately 0.2 seconds to provide a surface which did not adhere to sticky substance e.g. adhesive tape.

The coating possessed a slight odour. This was, however, much less marked than that obtained with paper which had been similarly treated except that a vinyl siloxane was employed in place of the cyclohexenylethylsiloxane.

EXAMPLE 2

Employing the method described in Example 1 4-vinylcyclohexene (432 g) was reacted with 273.6 g of the siloxane

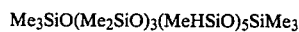

The resulting product was a methyl(cyclohexenylethyl)siloxane having the average formula

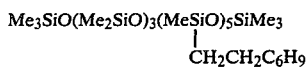
$$Me_3SiO(Me_2SiO)_3(MeSiO)_5SiMe_3$$
$$|$$
$$CH_2CH_2C_6H_9$$

This siloxane product (8 parts) was then mixed with the mercaptoalkylsiloxane polymer (90.5 parts) employed in Example 1 and benzophenone (1.5 parts). The resulting mixture was then coated on to Super Callendered Kraft paper at a level of about 0.8 g per square meter employing a blade coater and the coating exposed to U.V. light as described in Example 1. Cure of the coating to provide a nonadherent surface occurred in <0.15 seconds.

The odour associated with the cured coating was significantly less than that of a coating obtained employing a combination of a vinylsiloxane and a mercaptoalkyl siloxane.

EXAMPLE 3

The siloxane

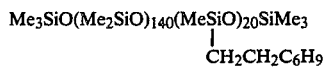
$$Me_3SiO(Me_2SiO)_{140}(MeSiO)_{20}SiMe_3$$
$$|$$
$$CH_2CH_2C_6H_9$$

was prepared by the reaction of a methylhydrogensiloxane (588 g) and 4-vinylcyclohexene (216 g) in the presence of chloroplatinic acid. Sixteen parts of this methyl(cyclohexenylethyl)siloxane were mixed with the mercaptoalkylsiloxane (82.5 parts) employed in Example 1 and benzophenone (1.5 parts). The mixture was applied as a coating to Super Callendered Kraft paper and cured as described in Example 1.

Cure of the coating to a non-adherent surface occurred in approximately 0.2 seconds. The odour associated with the coating was significantly less pronounced than that obtained with a mercaptoalkylsiloxane/vinylsiloxane composition.

EXAMPLE 4

The organosiloxane

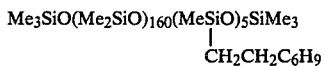
$$Me_3SiO(Me_2SiO)_{160}(MeSiO)_5SiMe_3$$
$$|$$
$$CH_2CH_2C_6H_9$$

was prepared by base catalysed equilibration. Dimethylcyclosiloxane (355 g) and the methyl cyclohexenylethyl siloxane of Example 2 (37.4 g) were reacted at 140°-155° C. for 4 hours in presence of a potassium silanolate catalyst (3.9 g). The catalyst was neutralised with CO$_2$ and the product filtered and stripped of volatile materials. The resulting organosiloxane was mixed with a mercaptoalkylsiloxane polymer of the structure

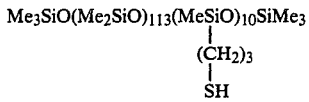
$$Me_3SiO(Me_2SiO)_{113}(MeSiO)_{10}SiMe_3$$
$$|$$
$$(CH_2)_3$$
$$|$$
$$SH$$

in amount to provide a ratio of —RSH groups to —C=C— groups of 2:1. Benzophenone was included in the composition to the extent of 1.5% by weight of the composition.

The mixture was applied as a coating to Super Callendered Kraft paper and cured as described in Example 1. Cure of the coating to a non-adherent surface occurred in approximately 0.2 seconds. The odour associated with the coating was significantly less pronounced than that of a coating obtained employing a combination of a vinylsiloxane and a mercaptoalkyl siloxane.

EXAMPLE 5

The organosiloxane

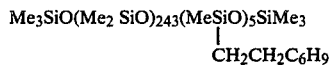
$$Me_3SiO(Me_2SiO)_{243}(MeSiO)_5SiMe_3$$
$$|$$
$$CH_2CH_2C_6H_9$$

was prepared by base catalysed equilibration. Dimethylcyclosiloxane (1000 g) and the methyl cyclohexenylethyl siloxane of Example 2 (68.9 g) were reacted at 140°-150° C. for 4 hours in presence of a potassium silanolate catalyst (10.7 g). The catalyst was neutralised with CO$_2$ and the product filtered and stripped of volatile materials. The resulting organosiloxane was mixed with the mercaptoalkylsiloxane polymer used in Example 4 in amount to provide a ratio of —RSH groups to —C=C— groups of 2:1. Benzophenone was included in the composition to the extent of 1.5% by weight of the composition.

The mixture was applied as a coating to Super Callendered Kraft paper and cured as described in Example 1. Cure of the coating to a non-adherent surface occurred in approximately 0.2 seconds. The odour associated with the coating was significantly less pronounced than that of a coating obtained employing a combination of a vinylsiloxane and a mercaptoalkyl siloxane.

EXAMPLE 6

The organosiloxane

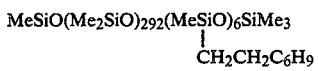
$$MeSiO(Me_2SiO)_{292}(MeSiO)_6SiMe_3$$
$$|$$
$$CH_2CH_2C_6H_9$$

was prepared by reaction between 4-vinylcyclohexene and the siloxane

$$Me_3SiO(Me_2SiO)_{292}(MeHSiO)_6SiMe_3$$

in presence of a platinum catalyst. The resulting organo siloxane was mixed with a mercaptoalkylsiloxane polymer of the structure

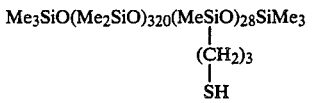
$$Me_3SiO(Me_2SiO)_{320}(MeSiO)_{28}SiMe_3$$
$$|$$
$$(CH_2)_3$$
$$|$$
$$SH$$

in amount to provide a ratio of —RSH groups to —C=C— groups of 2:1. Benzophenone was included in the composition to the extent of 1.5% by weight of the composition.

The mixture was applied as a coating to Super Callendered Kraft paper and cured as described in Example 1. Cure of the coating to a non-adherent surface occurred in approximately 0.2 seconds. The odour associated with the coating was significantly less pronounced than that of a coating obtained employing a combination of a vinylsiloxane and an mercaptoalkylsiloxane.

EXAMPLE 7

The organosiloxane

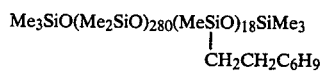

Me₃SiO(Me₂SiO)₂₈₀(MeSiO)₁₈SiMe₃
                    |
                    CH₂CH₂C₆H₉ was prepared by reaction between 4-vinylcyclohexene and the siloxane

Me₃SiO(Me₂SiO)₂₈₀(MeHSiO)₁₈SiMe₃ in presence of a platinum catalyst. Portions of the resulting organosiloxane were mixed with the mercaptoalkylsiloxane polymer used in Example 4 in an amount to provide a ratio of —RSH groups to —C=C— groups of (a) 2:1, (b) 1:1 and (c) 1:2. Benzophenone was included in the mixed compositions to the extent of 1.5% by weight of the composition.

The mixtures were applied as coatings to Super Callendered Kraft paper and cured as described in Example 1. Cure of the coatings to a non-adherent surface occurred in approximately 0.2 seconds. The odour associated with the coatings was significantly less pronounced than that of a coating obtained employing a combination of a vinylsiloxane and a mercaptoalkylsiloxane.

The odour of coatings formed according to the Examples was assessed by smelling the cured coatings. Release properties of coatings formed according to the Examples were assessed by various tests as set forth below. Results of tests 2 and 3 are recited in the Table. From the tests shown in the Table one may conclude that the cured compositions demonstrate the possibility of use as release coatings for adhesive compositions.

Test 1

A strip of Sellotape was adhered to the cured coating after exposure to UV lamps, by finger pressure. The Sell-o-tape was removed from the coating and immediately the tape was looped and the adhesive surfaces pressed against each other. Good adhesion was observed with tapes removed from coatings formed with each of the example compositions thus showing the cured coatings did not adhere to sticky substances i.e. provided a non-adherent surface coating.

Test 2

A strip of 50 mm wide adhesive tape (Takstrip) bearing a permanently tacky adhesive composition based on styrene butadiene rubber was pressed against the cured coatings obtained as described in the Examples. The samples were aged at room temperature for 20 hours and then the effort in g/inch width required to separate them using a 180° peel at a rate of 30 cm per minute was recorded. The values achieved were regarded as indicative of release properties of the cured coatings.

Test 3

A strip of 38 mm wide adhesive tape bearing a permanently tacky adhesive composition based on an acrylate polymer was pressed against the cured coatings obtained as described in the Examples. The samples were aged at room temperature for 20 hours and then the effort in g/inch width required to separate them using a 180° peel at a rate of 30 cm/minute was recorded. The values achieved were regarded as indicative of release properties of the cured coatings.

TABLE

| Composition of Example | 180° peel at 30 cm/minute - g/inch width | |
|---|---|---|
| | Test 2 | Test 3 |
| 1 | 28 | |
| 2 | 21 | |
| 3 | 8* | 110 |
| 4 | 19 | 32 |
| 5 | 14 | 34 |
| 6 | 11 | 34 |
| 7 (a) | 30 | |
| 7 (b) | 21 | |
| 7 (c) | 10 | |

*38 mm wide Takstrip

That which is claimed is:

1. A curable organosiloxane composition comprising (A) an organosiloxane having in the molecule at least two siloxane units of the general formula

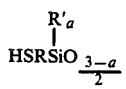

$$HSRSiO_{\frac{3-a}{2}} \quad \text{(i)}$$

with R'ₐ substituent wherein R represents a divalent saturated aliphatic hydrocarbon group having from 3 to 8 inclusive carbon atoms, R' represents a monovalent hydrocarbon group having from 1 to 6 inclusive carbon atoms and free of aliphatic unsaturation, an alkoxy group having from 1 to 4 carbon atoms or an alkoxyalkoxy group having from 2 to 6 carbon atoms and a has a value of 0, 1 or 2, any remaining units having the general formula

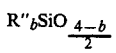

$$R''_b SiO_{\frac{4-b}{2}} \quad \text{(ii)}$$

wherein R" represents a monovalent hydrocarbon group having from 1 to 6 carbon atoms and free of aliphatic unsaturation and b has a value of 0, 1, 2 or 3 at least 50 percent of the total R' and R" groups being methyl, (B) an organosiloxane having in the molecule at least two units of the general formula

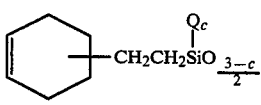

$$-CH_2CH_2SiO_{\frac{3-c}{2}} \quad \text{(iii)}$$

with Q_c substituent wherein Q represents a monovalent hydrocarbon group having from 1 to 6 inclusive carbon atoms and free of aliphatic unsaturation, an alkoxy group having from 1 to 4 carbon atoms or an alkoxyalkoxy group having from 2 to 6 carbon atoms and c is 0, 1 or 2, any remaining units having the general formula

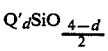

$$Q'_d SiO_{\frac{4-d}{2}} \quad \text{(iv)}$$

wherein Q' is as defined for R" and d has a value of 0, 1, 2 or 3, at least 50 percent of the total Q and Q' groups being methyl, and (C) photoinitiator.

2. A composition according to claim 1 wherein the organosiloxane (A) is a copolymer containing units of formulae (i) and (ii) in which the substituent R comprises —(CH₂)₃—, CH₂CH(CH₃)CH₂—(CH₂)₄— or —(CH₂)₆— and at least 50% of the R' and R" substituents are methyl groups.

3. A composition according to claim 1 wherein the polysiloxane (A) has from 5 to 20% siloxane groups according to the general formula (i).

4. A composition according to claim 1 wherein the organosiloxane (B) is according to the average general formula

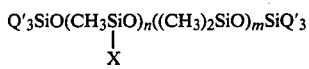

wherein x denotes the cyclohexyenylethyl group has a value from about 5 to about 20 and m has a value greater than about 140.

5. A composition according to claim 4 wherein each Q' represents the methyl group and m has a value from about 140 to about 500.

6. A composition according to claim 1 wherein the organosiloxanes (A) and (B) are used in amounts to provide a ratio of —SH groups to —C≡C— groups of the order of 2:1.

7. A process for treating a substrate which comprises applying to a substrate a coating of a curable organosiloxane composition comprising (A) an organosiloxane having in the molecule at least two siloxane units of the general formula

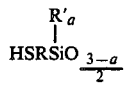 (i)

wherein R represents a divalent saturated aliphatic hydrocarbon group having from 3 to 8 inclusive carbon atoms, R' represents a monovalent hydrocarbon group having from 1 to 6 inclusive carbon atoms and free of aliphatic unsaturation, an alkoxy group having from 1 to 4 carbon atoms or an alkoxyalkoxy group having from 2 to 6 carbon atoms and a has a value of 0, 1 or 2, any remaining units having the general formula

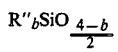 (ii)

wherein R" represents a monovalent hydrocarbon group having from 1 to 6 carbon atoms and free of aliphatic unsaturation and b has a value of 0, 1, 2 or 3 at least 50 percent of the total R' and R" groups being methyl, (B) an organosiloxane having in the molecule at least two units of the general formula

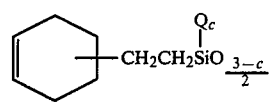 (iii)

wherein Q represents a monovalent hydrocarbon group having from 1 to 6 inclusive carbon atoms and free of aliphatic unsaturation, an alkoxy group having from 1 to 4 carbon atoms or an alkoxyalkoxy group having from 2 to 6 carbon atoms and c is 0, 1 or 3, any remaining units having the general formula

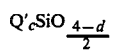 (iv)

wherein Q' is as defined for R" and d has a value of 0, 1, 2 or 3, at least 50 percent of the total Q and Q' groups being methyl, and (C) photoinitiator and thereafter exposing the coating to ultra-violet radiation.

8. A process according to claim 7 wherein the organosiloxane (A) is a copolymer containing units of formulae (i) and (ii) in which the substituent R comprises —(CH$_2$)$_3$—, CH$_2$CH(CH$_3$)CH$_2$—(CH$_2$)$_4$— or —(CH$_2$)$_6$— and at least 50% of the R' and R" substituents are methyl groups.

9. A process according to claim 7 wherein the polysiloxane (A) has from 5 to 20% siloxane groups according to the general formula (i).

10. A process according to claim 7 wherein the organosiloxane (B) is according to the average general formula

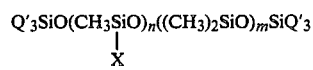

wherein x denotes the cyclohexenylethyl group, n has a value from about 5 to about 20 and m has a value greater than about 140.

11. A process according to claim 10 wherein each Q' represents the methyl group and m has a value from about 140 to about 500.

12. A process according to claim 7 wherein the organosiloxanes (A) and (B) are used in amounts to provide a ratio of —SH groups to —C≡C— groups of the order of 2:1.

13. A substrate having a coating formed by the method of claim 7.

14. A substrate comprising a paper substrate having a release coating formed by the method of claim 7.

* * * * *

UNITED STATES PATENT AND TRADEMARK OFFICE
CERTIFICATE OF CORRECTION

PATENT NO. : 4,587,136
DATED : May 6, 1986
INVENTOR(S) : James W. White and Brian J. Griffiths It is certified that error appears in the above-identified patent and that said Letters Patent is hereby corrected as shown below:

In Col. 2, line 46, "$CH_2CH(CH_3)CH_2$," should read -- $-CH_2CH(CH_3)CH_2-$, --.

In Col. 10, line 66, "$CH_2CH(CH_3)CH_2-(CH_2)_4-$" should read -- $-CH_2CH(CH_3)CH_2-$, $-(CH_2)_4-$ --.

In Col. 11, line 13, "cyclohexenylethyl group has" should read --cyclohexenylethyl group, n has--.

In Col. 12, line 24, "$CH_2CH(CH_3)CH_2-(CH_2)_4-$" should read -- $-CH_2CH(CH_3)CH_2-$, $-(CH_2)_4-$ --.

Signed and Sealed this

Ninth Day of September 1986

[SEAL]

Attest:

DONALD J. QUIGG

Attesting Officer      Commissioner of Patents and Trademarks